July 9, 1940. J. WOLFATER 2,207,140
TRAP
Filed Sept. 21, 1939
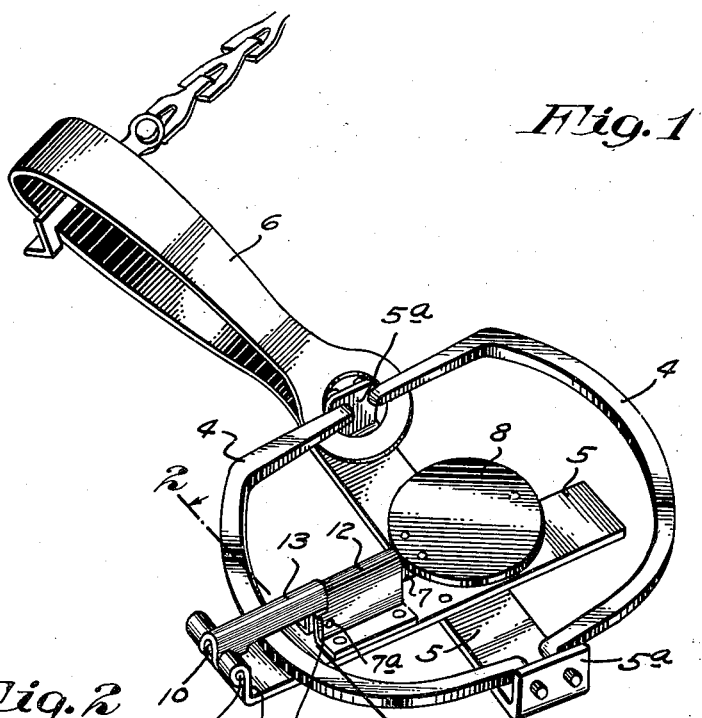
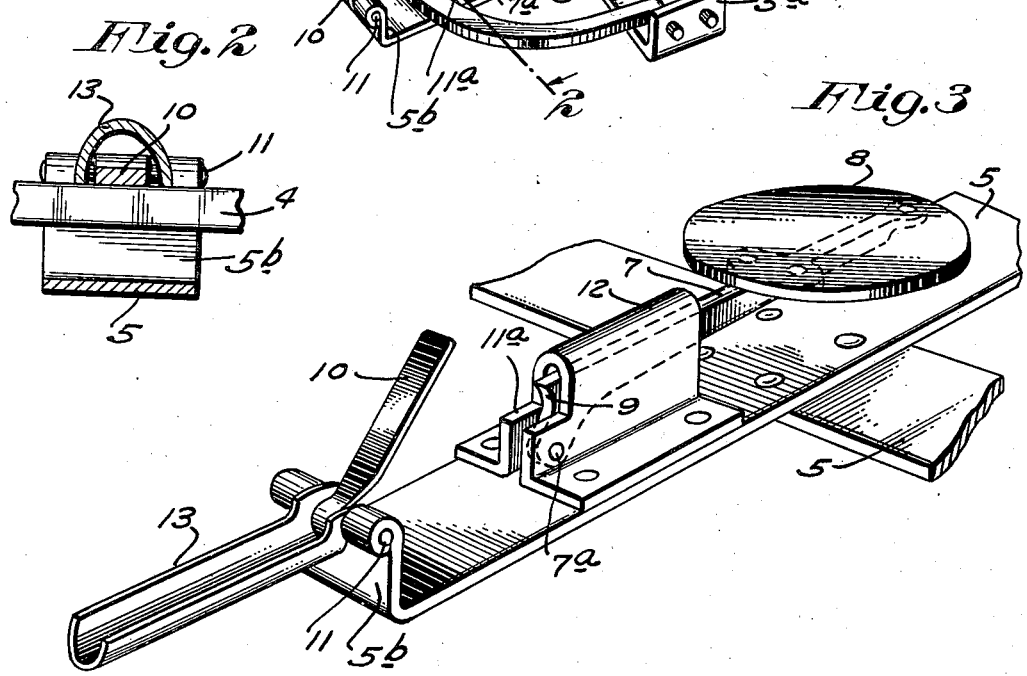
Inventor
John Wolfater
By his Attorneys
Michael & Michael Patented July 9, 1940

2,207,140

UNITED STATES PATENT OFFICE 2,207,140

TRAP

John Wolfater, Remer, Minn., assignor to James B. Linsmayer, Minneapolis, Minn.

Application September 21, 1939, Serial No. 295,921

5 Claims. (Cl. 43—92)

My invention relates to animal traps and has for its object the provision of means therefor that will prevent the trap from being prematurely set off, all as will be hereinafter more fully explained.

Particularly the invention relates to animal traps of the conventional type wherein a pair of jaws are pivoted to a base, are subject to an actuating spring and the jaws of which are arranged to be locked or set for action by the engagement of a pivoted latch bar with the trigger bar of the trap. In such conventional traps the trigger bar is provided with a bait plate or holder located at the center of the set trap. The trigger is held set by a very delicate and easily broken connection between the same and the pivoted latch bar. In actual use of the device the traps have frequently been prematurely released or set off by an animal pressing the latch bar while its body and only a portion of one paw, for example, may be within the range of the jaws. It has frequently resulted that traps have thus been set off by contact with the latch bar under conditions which either throw the animal bodily out of the range of the jaws or cause the jaws to catch possibly only the tips of a paw. In this way animals by the set off traps have been frequently thrown aside and not caught or are caught only to such an extent that the animal could chew off a part of the paw and escape.

My invention provides certain guards or shields that prevent the trap from being set off until the animal or at least a paw has reached the center of the trap and set off the trap by engagement with the bait plate or holder located at the center of the set trap.

The invention is illustrated in the accompanying drawing wherein like characters indicate like parts throughout the several views.

Referring to the drawing:

Fig. 1 is a perspective showing a conventional trap of the character above indicated, the guards or shields of my invention applied thereto, the trap being set for action;

Fig. 2 is a fragmentary section taken on the line 2—2 of Fig. 1; and

Fig. 3 is a perspective showing the base, the trigger, the trigger latch bar and the shields applied in accordance with the preferred form of my invention.

Of the conventional parts of the trap, numeral 4 indicates the jaws which are pivoted in the usual way to upturned lugs 5a of the base 5, which latter, as shown, is made up of transversely crossed flat bars. The numeral 6 indicates the customary U-shaped trap actuating spring, the ends of which are perforated and inserted over one of the upturned ends or lugs 5a of the base 5. The numeral 7 indicates the trigger bar pivoted to the base 5 at 7a and provided at its free end with a bait holding plate 8. Near and immediately over its pivoted portion 7a trigger bar 7 has an undercut latch lug 9 that is adapted to be engaged by the free end of a latch bar 10 that is pivoted to an upturned lug 5b of the base 5 by a pivot pin 11.

The structure so far specifically described is that of an ordinary commercial trap in which, under the force of the spring 6 acting through the set jaws 4 and on the latch bar 10, the trigger bar will be held raised by frictional contact between bar 10 and undercut lug 9.

As already indicated, in the structure so far specifically described, if a paw of an animal should rest on the latch bar 10, trigger bar would be permitted to fall and the trap would be sprung with the undesirable actions already above noted. Also, if the paw should press on the base of the trigger bar 7, the trap would be prematurely sprung.

To prevent the above noted undesirable actions, an inverted channel-shaped shield 12 is placed as a hood over the major portion of the trigger bar 7 and is riveted or otherwise rigidly secured to the base 5. This shield 12 prevents the animal's paw from engaging the trigger bar 7.

To prevent the trap from being prematurely sprung by pressure on the latch bar 10, I provide an inverted channel-shaped shield 13 in the nature of a bridge bar that is pivoted to the lug 5b on the pin 11. This shield 13, when turned downward over the latch bar 10 of the set trap, overlaps and rests upon the fixed shield 12, thereby effectively preventing the latch bar from being engaged to trip the trap.

With the improved features applied to the trap it is evident that the trap can be set off only by engagement of the centrally located plate 8 of the trigger. As the bait will be applied on this plate 8, it is the only part of the trap by engagement or pressure of which the trap can be set off. Certain and proper catching of the animal is thereby insured.

The preferred form of the improved trap attachments have been illustrated in the drawing, but it will be understood that they may be varied within the scope of the invention herein disclosed and claimed.

What I claim is:

1. In an animal trap, a base, jaws pivoted to said base, a spring operative to close the jaws, a trigger bar pivoted to the base with an exposed portion at the center of the trap, a latch bar pivoted to said base and having latching contact with said trigger bar for setting the trap under the tension of said spring, and a shield pivoted to said base coincident with the pivot between said latch bar and base, said shield being movable to a fixed position overlying the latch bar of the set trap to protect said latch bar against accidental manipulation.

2. In an animal trap, a base, jaws pivoted to said base, a spring operative to close the jaws, a trigger bar pivoted to the base with an exposed portion at the center of the trap, a latch bar pivoted to said base and having latching contact with said trigger bar for setting the trap under the tension of said spring, and a shield fixed to said base and overlying and covering the major portion of said trigger bar, in further combination with a bridge-acting shield pivoted to said base coincident with the pivoted connection between said latch bar and base, said bridge-acting shield, when turned downward to operative position, being engageable with said fixed shield to limit its downward movement.

3. In an animal trap, a base, jaws pivoted to said base, a spring operative to close the jaws, a trigger bar pivoted to the base with an exposed portion at the center of the trap, a latch bar pivoted to said base and having latching contact with said trigger bar for setting the trap under the tension of said spring, and a shield fixed to said base and overlying and covering the major portion of said trigger bar, in further combination with a bridge-acting shield pivoted to said base coincident with the pivoted connection between said latch bar and base, said bridge-acting shield, when turned downward to operative position, being engageable with said fixed shield to limit its downward movement, said pivoted shield being of channel-shaped form and when turned downward overlies and overlaps said latch bar.

4. In an animal trap, a base, jaws pivoted to said base, spring means operating to close said jaws, a trigger bar pivoted to said base with an exposed portion at the central portion of the trap, a latch bar pivoted to said base at a point outward of the position of the opened trap jaws and having latching contact with said trigger bar for setting the trap opened under the tension of said spring, a shielding member fixed to the base and overlying a portion of said trigger bar but spaced inward from the pivot of said latch bar so as to permit opening movement of the trap jaws, and a supplemental shield movably supported by said base and arranged to overlie one of the jaws of the opened trap and to bridge the space between said fixed shield and the pivoted outer end of said latch bar.

5. In an animal trap, a base, jaws pivoted to said base, spring means operating to close said jaws, a trigger bar pivoted to said base with an exposed portion at the central portion of the trap, a latch bar pivoted to said base at a point outward of the position of the opened trap jaws and having latching contact with said trigger bar for setting the trap opened under the tension of said spring, a shielding member fixed to the base and overlying a portion of said trigger bar but spaced inward from the pivot of said latch bar so as to permit opening movement of the trap jaws, and a supplemental shield mounted on a common pivot with said latch bar with its free end adapted to engage upon said fixed shield to form a protecting bridge over the latch bar of the set trap.

JOHN WOLFATER.